(12) United States Patent
Sako

(10) Patent No.: US 8,368,927 B2
(45) Date of Patent: Feb. 5, 2013

(54) INFORMATION PROCESSING APPARATUS, CONTROL METHOD THEREOF, AND PROGRAM

(75) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 12/399,908

(22) Filed: Mar. 6, 2009

(65) Prior Publication Data

US 2009/0244607 A1 Oct. 1, 2009

(30) Foreign Application Priority Data

Mar. 28, 2008 (JP) ................................. 2008-088259

(51) Int. Cl.
*G06F 3/12* (2006.01)
*G06K 15/00* (2006.01)
*H04N 1/00* (2006.01)

(52) U.S. Cl. ..................... 358/1.15; 358/1.13; 358/1.14; 358/404; 358/405; 358/407; 358/434

(58) Field of Classification Search ................ 358/3.22, 358/3.23, 1.13–1.15, 404–407, 434
See application file for complete search history.

(56) References Cited

U.S. PATENT DOCUMENTS

| | | | | |
|---|---|---|---|---|
| 6,757,255 B1* | 6/2004 | Aoki et al. | ..................... | 370/252 |
| 7,197,014 B2* | 3/2007 | Katsuyama et al. | .......... | 370/252 |
| 7,706,266 B2* | 4/2010 | Plamondon | ................... | 370/230 |
| 7,791,748 B2* | 9/2010 | Izumi et al. | .................. | 358/1.15 |
| 8,116,215 B2* | 2/2012 | Park | .............................. | 370/252 |
| 2006/0055963 A1* | 3/2006 | Otsuka et al. | ................ | 358/1.15 |

FOREIGN PATENT DOCUMENTS

| | | |
|---|---|---|
| JP | 6-37806 | 2/1994 |
| JP | 2002-164890 | 6/2002 |
| JP | 2003-289326 | 10/2003 |
| JP | 2006-13920 | 1/2006 |
| JP | 2007-116470 | 5/2007 |

OTHER PUBLICATIONS

Japanese Office Action dated Aug. 6, 2012 issued during prosecution of related Japanese application No. 2008-088259.
Japanese Office Action dated May 18, 2012 issued during prosecution of related Japanese application No. 2008-088259.

* cited by examiner

*Primary Examiner* — Benny Q Tieu
*Assistant Examiner* — Jonathan Beckley
(74) *Attorney, Agent, or Firm* — Fitzpatrick, Cella, Harper & Scinto

(57) ABSTRACT

Provided is an information processing apparatus which suitably collects information necessary for performing a cause analysis when a communication failure occurs. To accomplish this, when communication is performed between an information processing apparatus 102 and an external apparatus 101 through a network, determination is made as to whether or not the communication between the information processing apparatus 102 and the external apparatus 101 has properly been performed from the time the connection is established until the time the connection is disconnected. As a result of the determination, if it is determined that the communication during the connection has not properly been performed, communication packets transmitted or received between the information processing apparatus 102 and the external apparatus 101 during the connection are stored.

9 Claims, 8 Drawing Sheets

FIG. 4

| PRIORITY ORDER 401 | COMMUNICATION MODE 402 |
|---|---|
| 1 | 1000BASE-T (FULL-DUPLEX) |
| 2 | 1000BASE-T (HALF-DUPLEX) |
| 3 | 100BASE-TX (FULL-DUPLEX) |
| 4 | 100BASE-TX (HALF DUPLEX) |
| 5 | 10BASE-T (FULL-DUPLEX) |
| 6 | 10BASE-T (HALF DUPLEX) |

| CONNECTION-ORIENTED COMMUNICATION PROTOCOL TYPE | PORT NUMBER |
|---|---|
| RAW | 9100 |
| LPR | 515 |
| IPP | 631 |
| SMB | 139 |

FIG. 7

<table>
<tr><th rowspan="2" colspan="2"></th><th colspan="6">COMMUNICATION MODE</th></tr>
<tr><th>10Base-T (HALF-DUPLEX)</th><th>10Base-T (FULL-DUPLEX)</th><th>100Base-TX (HALF-DUPLEX)</th><th>100Base-TX (FULL-DUPLEX)</th><th>1000Base-T (HALF-DUPLEX)</th><th>1000Base-T (FULL-DUPLEX)</th></tr>
<tr><td rowspan="4">COMMUNICATION PROTOCOL</td><td>RAW</td><td>0.8Mbps</td><td>1Mbps</td><td>1.4Mbps</td><td>1.8Mbps</td><td>6Mbps</td><td>6Mbps</td></tr>
<tr><td>LPR</td><td>0.8Mbps</td><td>1Mbps</td><td>1.6Mbps</td><td>2Mbps</td><td>6Mbps</td><td>6Mbps</td></tr>
<tr><td>IPP</td><td>480Kbps</td><td>600Kbps</td><td>480Kbps</td><td>600Kbps</td><td>4.8Mbps</td><td>6Mbps</td></tr>
<tr><td>SMB</td><td>720Kbps</td><td>900Kbps</td><td>720Kbps</td><td>900Kbps</td><td>6Mbps</td><td>6Mbps</td></tr>
</table>

INFORMATION PROCESSING APPARATUS, CONTROL METHOD THEREOF, AND PROGRAM

BACKGROUND OF THE INVENTION

1. Field of the Invention

The present invention relates to an information processing apparatus which performs communication with an external apparatus connected through a network. Particularly, the present invention relates to an information processing apparatus which stores communication packets transmitted or received between the information processing apparatus and an external apparatus in a case where it is determined that communication between the information processing apparatus and the external apparatus has not properly been performed.

2. Description of the Related Art

Recently, information processing systems for receiving electronic data from an external apparatus through a network and processing the electronic data have grown popular. Many of these information processing systems adopt the TCP/IP in a network.

In such a TCP/IP-based network, in order to provide users with high-quality communication, it is important to analyze communication environment, specify causes of communication failure, for example, a low throughput, and take steps for improvement, for example, building more communication lines. In order to analyze communication environment, for instance, communication packets transmitted or received between terminals may be stored as log data as needed. With the use of the log data stored in this manner, communication environment, for example, traffic volume for each line and user, a rate of retransmission and so forth, is analyzed and a cause of communication failure can be specified. Furthermore, the bottleneck place can be specified by using MIB information of a router and packet information.

Japanese Patent Application Laid-Open No. 2002-164890 proposes a diagnosis apparatus, which extracts a diagnosis-target flow satisfying a predetermined condition, and diagnoses communication environment based on the network configuration and statistic data related to the traffic in the communication line for each application.

However, in the aforementioned conventional art, all communication packets transmitted or received between an information processing system and an external apparatus must be stored. This is causing a problem of time-consuming analysis of a communication environment. In particular, in a case where a service person visits a customer to collect communication packets, this problem causes reduced work efficiency of the service person. Instead of a service person visiting a customer to collect communication packets, it is possible to consider a mechanism in which an information processing system automatically collects communication packets and keeps them in storage. However, this also causes a problem because it is necessary to provide a memory source for storing a large amount of communication packets.

Furthermore, in the diagnosis apparatus disclosed in Japanese Patent Application Laid-Open No. 2002-164890, communication packets are monitored for a long period of time to accumulate statistic data, and communication environment is automatically diagnosed for each host unit or application program based on the accumulated statistic data. However, according to the method disclosed in No. 2002-164890, an analysis of the communication environment is not performed based on the stored communication packets, but based on statistic information which is produced based on header information of the communication packets. Therefore, if statistic data is to be stored in addition to communication packets, the above-described problem will also arise.

SUMMARY OF THE INVENTION

The present invention enables realization of an information processing apparatus which suitably collects information necessary for performing a cause analysis when a communication failure occurs.

One aspect of the present invention provides an information processing apparatus, which is connected to an external apparatus through a network, and which has a communication packet storage unit configured to store a communication packet that has been transmitted or received in communication between the information processing apparatus and the external apparatus, comprising: a communication unit configured to establish connection for communication between the information processing apparatus and the external apparatus; a determination unit configured to determine whether or not the communication between the information processing apparatus and the external apparatus has properly been performed from the time the connection is established until the time the connection is disconnected; and a control unit configured to, in a case where it is determined as a result of the determination by the determination unit that the communication during the connection has not properly been performed, have the communication packet storage unit maintain the communication packet that has been transmitted or received between the information processing apparatus and the external apparatus from the time the connection is established until the time the connection is disconnected.

Another aspect of the present invention provides a control method of an information processing apparatus, which is connected to an external apparatus through a network and which has a communication packet storage unit configured to store a communication packet that has been transmitted or received in communication between the information processing apparatus and the external apparatus, comprising: establishing connection for communication between the information processing apparatus and the external apparatus; determining whether or not the communication between the information processing apparatus and the external apparatus has properly been performed from the time the connection is established until the time the connection is disconnected; and in a case where it is determined as a result of the determination in the determining step that the communication during the connection has not properly been performed, having the communication packet storage unit maintain the communication packet that has been transmitted or received between the information processing apparatus and the external apparatus from the time the connection is established until the time the connection is disconnected.

Further features of the present invention will be apparent from the following description of exemplary embodiments with reference to the attached drawings.

BRIEF DESCRIPTION OF THE DRAWINGS

FIG. 4 shows a communication mode priority table 400 which is used when the information processing apparatus 102 according to an embodiment of the present invention decides a communication mode;

FIG. 6 shows an example of a table 600 defining connection-oriented communication protocol types, which are supported by the information processing apparatus 102 according to an embodiment of the present invention, and their corresponding TCP port numbers; and FIG. 7 shows an example of a table 700 for deciding a threshold value in the information processing apparatus 102 according to an embodiment of the present invention.

DESCRIPTION OF THE EMBODIMENTS

An embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
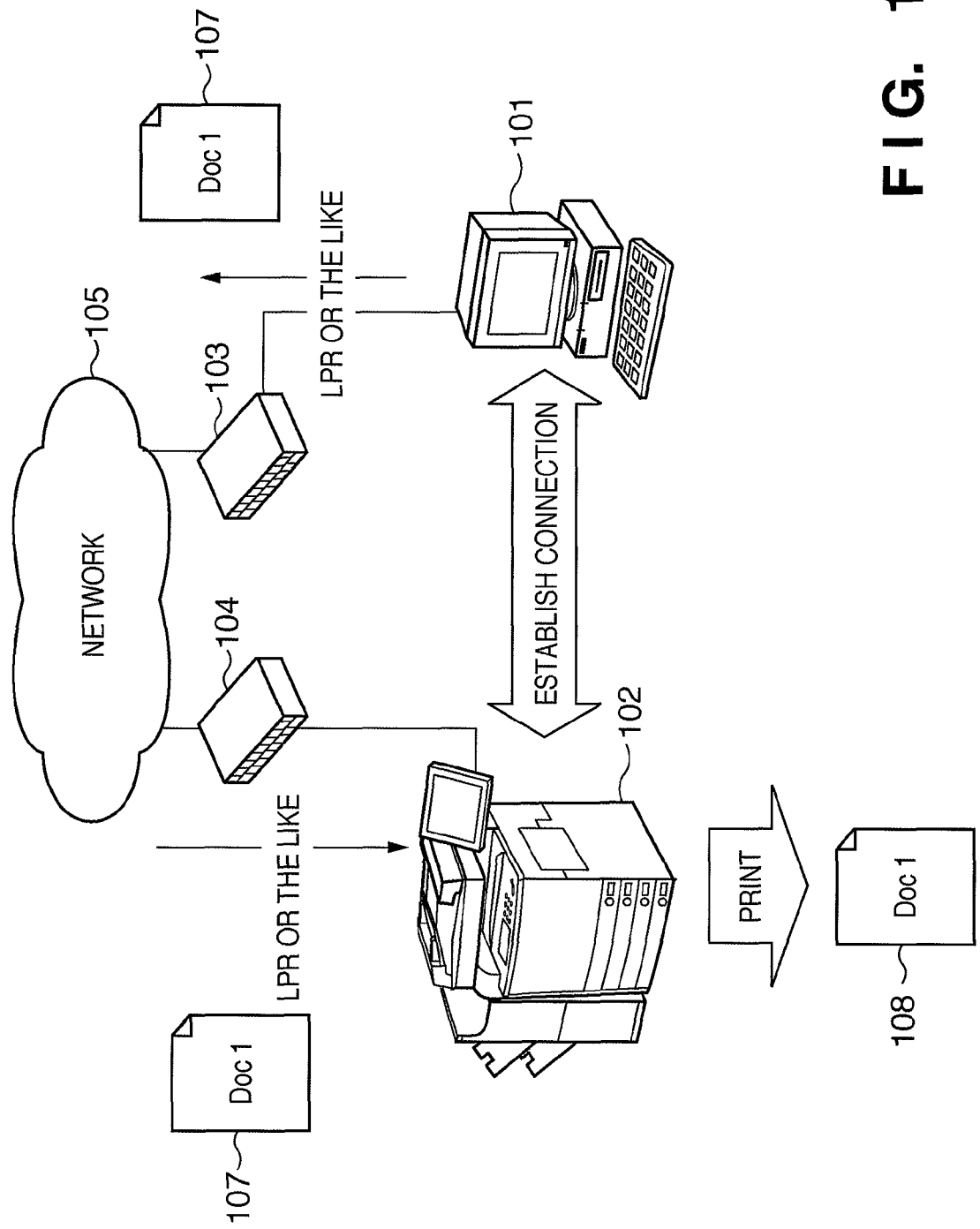
FIG. 1 is a diagram showing a general configuration of a network system according to an embodiment of the present invention.

Hereinafter, an embodiment of the present invention is described with reference to FIGS. 1 to 7. FIG. 1 is a diagram showing a general configuration of a network system according to the present embodiment.

<System Configuration>

The network system according to the present embodiment comprises a host computer 101, an information processing apparatus 102, and hubs 103 and 104. The hubs 103 and 104 are connected through a network 105 as shown in FIG. 1. The host computer 101 is connected to the network 105 through the hub 103. The information processing apparatus 102 is connected to the network 105 through the hub 104. In other words, the host computer 101 is connected to the information processing apparatus 102 through the network 105.

The host computer 101 establishes connection with the information processing apparatus 102 and transmits electronic data 107. The information processing apparatus 102 stores communication packet data, which is transmitted or received during the connection, in the HDD of the information processing apparatus 102. The present embodiment describes, as an example of the information processing apparatus 102, a printer serving as an image forming apparatus. However, the present invention is not limited to a printer, but is applicable to an information processing apparatus which performs data transmission and reception between the apparatus and an external apparatus through a network. The information processing apparatus 102 according to the present embodiment prints the electronic data 107, which has been received in the connection, on a printing medium 108.

<Configuration of Information Processing Apparatus>

Figure 2A:
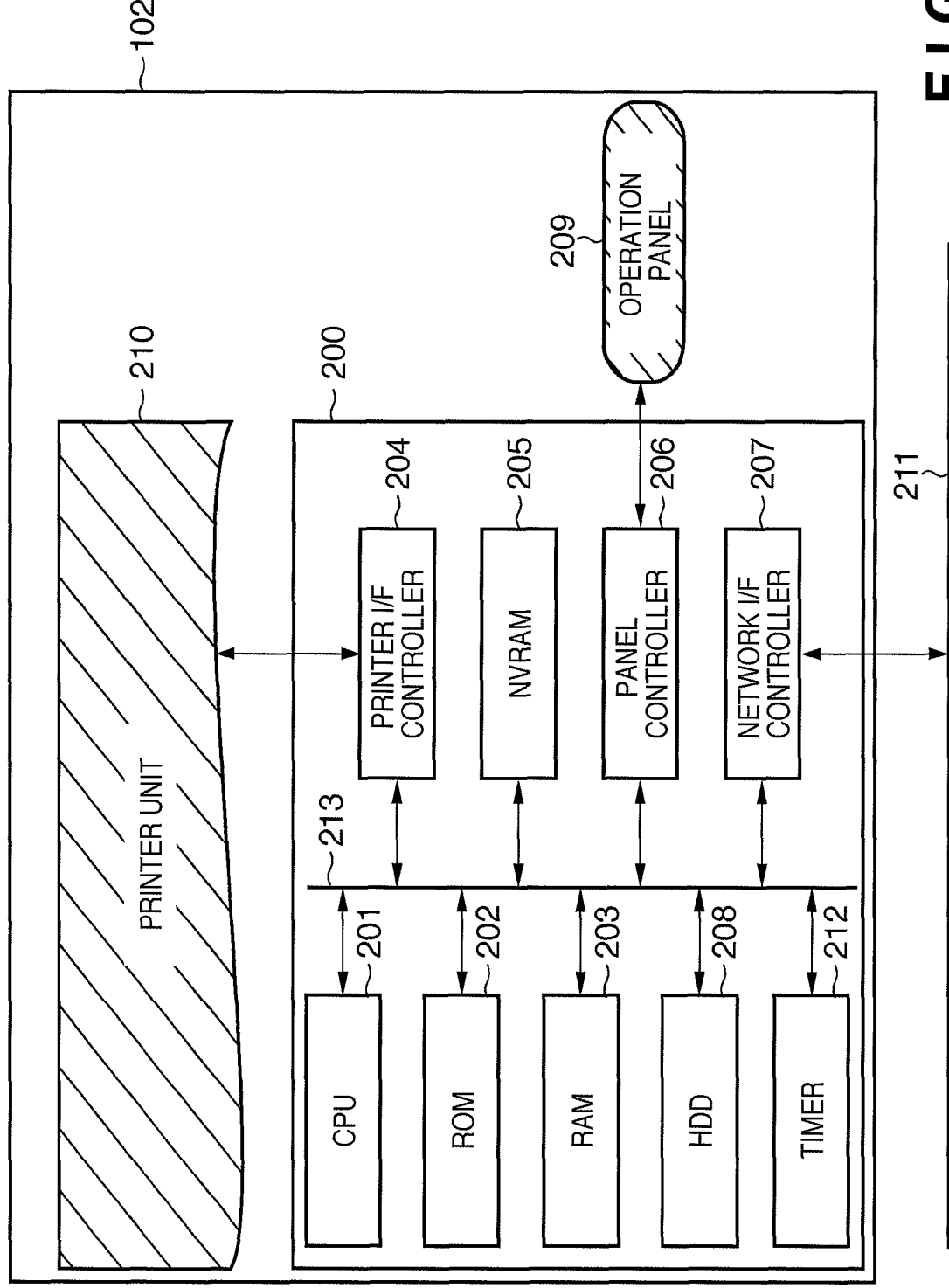
FIG. 2A is a diagram showing a control structure of an information processing apparatus 102 according to an embodiment of the present invention.

Next, a configuration of the information processing apparatus 102 is described with reference to FIGS. 2A and 2B. FIG. 2A is a diagram showing a control structure of the information processing apparatus 102 according to the embodiment. Herein, a control structure related to the present invention is mainly described. Therefore, the information processing apparatus 102 may be realized with inclusion of other configurations.

The information processing apparatus 102 comprises a system controller 200, a printer unit 210, and an operation panel 209. The information processing apparatus 102 is connected to the host computer 101 serving as an external apparatus through a LAN 211. The printer unit 210 performs print processing in accordance with control from the system controller 200. The operation panel 209 informs an operator of information and receives an input from an operator.

The system controller 200 comprises a CPU 201, ROM 202, RAM 203, a printer I/F controller 204, NVRAM 205, a panel controller 206, a network I/F controller 207, a HDD 208, and a timer 212. The CPU 201 executes a control program of the information processing apparatus 102 and controls the overall apparatus. The ROM 202 is read-only memory for storing a boot program of the apparatus, fixed parameters and so forth. The RAM 203 is random-access memory which is used, for instance, for temporary data storage when the CPU 201 controls the apparatus. The HDD 208 is a hard disk drive for storing print data and various data. The timer 212 controls a lapse of time in timer processing. The printer I/F controller 204 controls the printer unit 210. The NVRAM 205 is a nonvolatile memory for storing various setting values of the printer. The panel controller 206 controls the operation panel 209, displays various information, and receives command inputs from an operator. The network I/F controller 207 connects the apparatus 102 with the network 105 through the hub 104, and controls data transmission to and reception from an external apparatus connected to the network 105. For instance, the network I/F controller 207 establishes connection in order to perform communication with the host computer 101. These components are interconnected through a bus 213 so that control signals from the CPU 201 and data signals between the devices are transmitted or received.

Figure 2B:
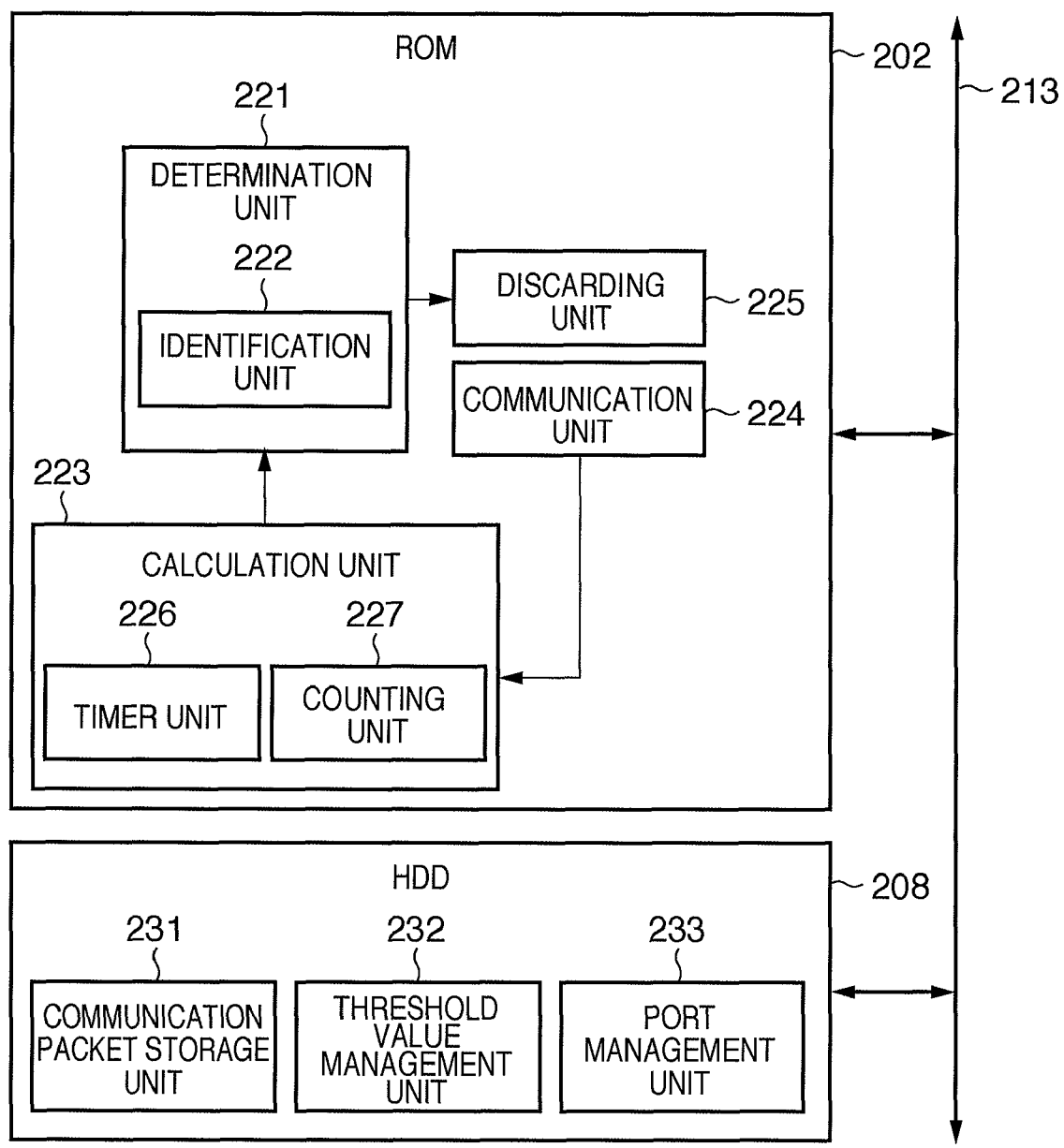
FIG. 2B is a diagram showing a configuration of a ROM 202 and an HDD 208 according to an embodiment of the present invention.

FIG. 2B is a diagram showing a software configuration of the ROM 202 and the HDD 208 according to the present embodiment. Note that each software shown in FIG. 2B is realized by executing, by the CPU 201, the control programs respectively stored in the ROM 202 and the HDD 208. Also note that although the following description gives an example in which information such as communication packets and respective management tables and the like are stored in the HDD 208, this information may be stored in the ROM 202, NVRAM 205 or the like. Further note that although the following description is provided only on the blocks related to the present embodiment, the ROM 202 and the HDD 208 may be configured with inclusion of other blocks.

The ROM 202 comprises a determination unit 221, an identification unit 222, a calculation unit 223, a communication unit 224, a discarding unit 225, a timer unit 226, and a counting unit 227. The HDD 208 comprises a communication packet storage unit 231, a threshold value management unit 232, and a port management unit 233.

The threshold value management unit 232 stores threshold values indicative of a lower limit of communication performance which is determined as proper in the communication between the apparatus 102 and the host computer 101 serving as an external apparatus. A different threshold value is managed for each combination of a communication protocol and a communication mode. Herein, communication performance denotes, for instance, communication speed. The port management unit 233 manages a port number of the information processing apparatus 102 in association with the communication protocol adopted by the port represented by the port number.

The communication packet storage unit 231 stores communication packets transmitted or received in communication between the information processing apparatus 102 and the host computer 101. These data are used to specify a cause of communication failure when it happens. However, if all communication packets are to be stored, the memory likely runs short. Therefore, the present embodiment improves memory efficiency by selectively collecting and maintaining the communication packets.

The communication unit 224 establishes connection between the host computer 101 and the information processing apparatus 102, and performs communication packet transmission or reception between the host computer 101 and the apparatus 102. The communication packets, which have been transmitted or received from the time the connection is established until the time the connection is disconnected, are stored in the communication packet storage unit 231.

The calculation unit 223 calculates communication performance during the period from the connection establishment to disconnection between the host computer 101 and the information processing apparatus 102. For calculation, the calculation unit 223 comprises a timer unit 226 and a counting unit 227. The counting unit 227 counts the total of the packet data size received during the period from the connection establishment to disconnection of the host computer 101 and the apparatus 102. Information indicative of the counted data size may be stored in the HDD 208. The timer unit 226 clocks the connection time, which indicates the time from connection establishment to disconnection between the host computer 101 and the apparatus 102. More specifically, the timer unit 226 clocks the connection time by the timer 212 shown in FIG. 2A. Based on the data size counted by the counting unit 227 and the connection time clocked by the timer unit 226, the calculation unit 223 calculates communication performance. To be more precise, assuming that a data size is S and connection time is T, the calculation unit 223 calculates S/T to obtain communication speed which represents communication performance.

The determination unit 221 determines whether or not communication has been performed properly by comparing the communication performance, which is calculated by the calculation unit 223, with the threshold value managed by the threshold value management unit 232. Further, the determination unit 221 comprises an identification unit 222 for identifying a communication protocol and communication mode of the established connection. Communication protocols include, for example, RAW which will be described later, LPR, IPP, SMB and so forth. Communication modes include, for example, 1000 BASE-T (full-duplex communication) which will be described later, 1000 BASE-T (half-duplex communication), 100 BASE-TX (full-duplex communication), 100 BASE-TX (half-duplex communication), 10 BASE-T (full-duplex communication), 10 BASE-T (half-duplex communication) and the like.

In a case where the determination unit 221 determines that the communication has not properly been performed, the discarding unit 225 makes the communication packet storage unit 231 maintain the stored communication packets. On the other hand, in a case where it is determined that communication has properly been performed, the discarding unit 225 discards the communication packets stored in the communication packet storage unit 231. In this manner, the discarding unit 225 makes the storage unit 231 maintain the communication packets that are necessary for performing a cause analysis when a communication failure occurs, while discarding other unnecessary communication packets.

<Communication Mode>

Figure 3:
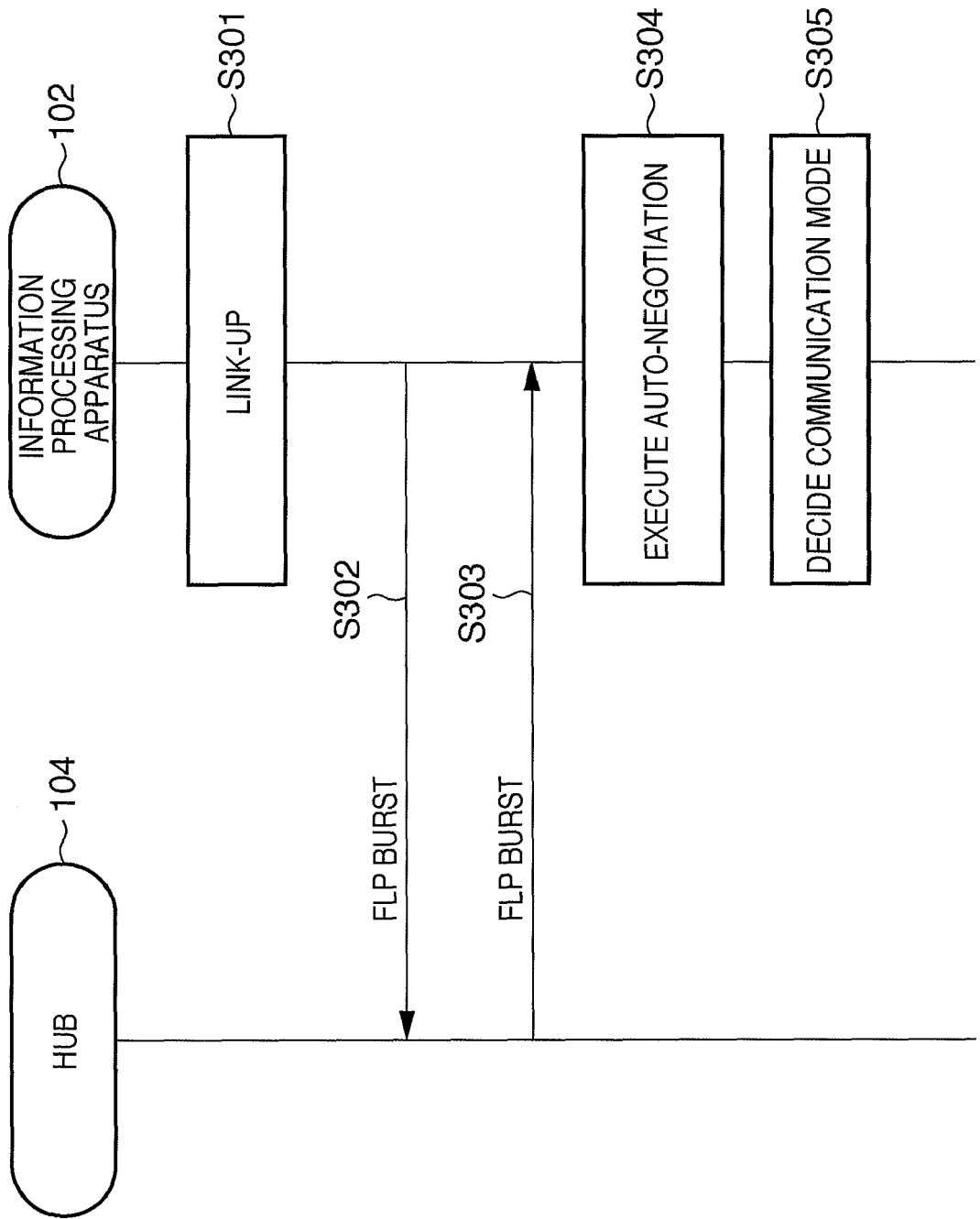
FIG. 3 is a diagram showing a communication mode decision sequence of the information processing apparatus 102 according to an embodiment of the present invention.

Next, communication mode decision control is described with reference to FIG. 3. FIG. 3 shows a communication mode decision sequence of the information processing apparatus 102 according to the present embodiment. The information processing apparatus 102 is directly connected to the hub 104 as shown in FIG. 1. Note that the overall processing of the information processing apparatus 102 which will be described below is controlled by the CPU 201.

First, in step S301, when the power of the information processing apparatus 102 is turned on, the CPU 201 links up the network interface using the network I/F controller 207. When the network interface is linked up, the CPU 201 transmits in step S302 a FLP (Fast Link Pulse) burst, which includes information indicative of the supported communication mode, to the hub 104 for communication mode negotiation.

In step S303, the hub 104 transmits a FLP burst, which includes communication mode information supported by the hub 104, to the information processing apparatus 102. Thereafter, in steps S304 and S305, the CPU 201 decides on a communication mode in accordance with a communication mode priority table 400 which will be described later.

FIG. 4 shows a communication mode priority table 400 which is used when the information processing apparatus 102 according to the present embodiment decides on a communication mode. There are six types of communication modes 402 proposed by a FLP burst. Each communication mode 402 has a priority order 401. The table in FIG. 4 is shown in accordance with the priority order. The communication mode priority table 400 is stored in advance in the ROM 202, NVRAM 205, or HDD 208.

The CPU 201 decides on a communication mode to be adopted with the use of the communication mode priority table 400 and the communication modes supported by the hub 104 and the information processing apparatus 102 that have been proposed by the FLP burst. More specifically, the CPU 201 selects a communication mode having the highest priority order among the communication modes supported by both the hub 104 and the apparatus 102, and decides on it as the communication mode to be adopted.

<Communication Packet Collecting Method>

Figure 5:
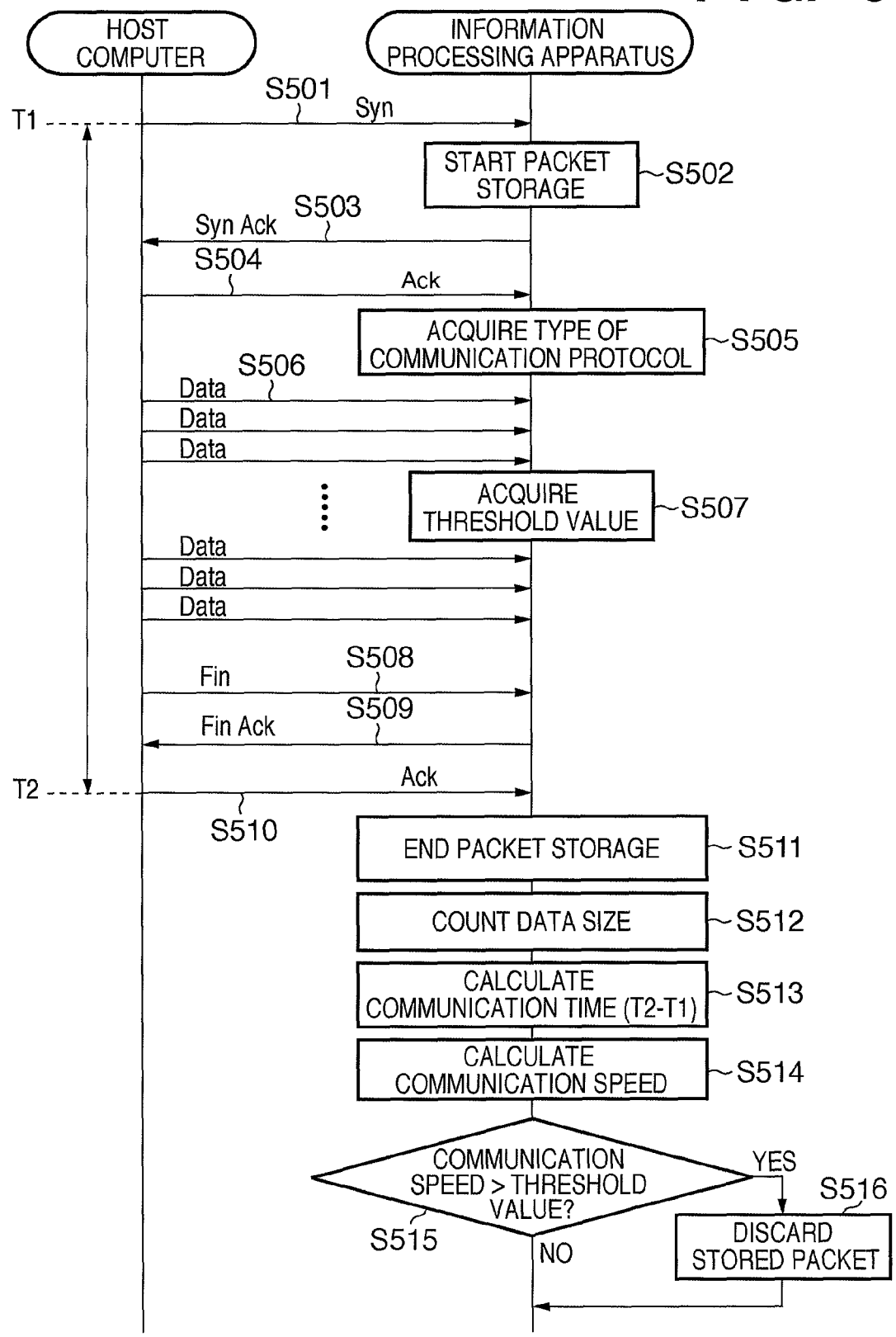
FIG. 5 is a diagram showing a communication packet data collecting sequence of the information processing apparatus 102 according to an embodiment of the present invention.

Next, a communication packet collecting method is described with reference to FIGS. 5 to 7. FIG. 5 shows a communication packet collecting sequence of the information processing apparatus 102 according to the present embodiment. Note, assumed herein is a case where print data is transmitted from the host computer 101 to the information processing apparatus 102 and print processing is executed by the information processing apparatus 102. Also note that the overall processing of the information processing apparatus 102 which will be described below is controlled by the CPU 201.

In step S501, the host computer 101 transmits a Syn packet which requests connection establishment to the information processing apparatus 102. The time of this transmission is defined T1. When the Syn packet is received, the timer unit 226 starts clocking the connection time using the timer 212. In step S502, the CPU 201 starts collecting the communication packets transmitted to or received from the communication packet storage unit 231. In step S503, the CPU 201 transmits a Syn_Ack packet, which accepts connection establishment request, to the host computer 101.

In step S504, the host computer 101 transmits an Ack packet, indicating that connection establishment has been completed, to the information processing apparatus 102. Thereafter, in step S506, the host computer 101 starts transmitting a Data packet including electronic data to the information processing apparatus 102.

Meanwhile, when the Ack packet in step S504 is received, the CPU 201 identifies in step S505 the type of communication protocol by the identification unit 222 in accordance with the port number used by the established connection. The identification unit 222 conducts a search in the information stored in advance in the ROM 202, using, for example, a port number, as a search keyword to acquire a communication protocol corresponding to the port number, thereby identifying the communication protocol. Next, in step S507, based on the identified communication protocol type and the communication mode decided by the sequence in FIG. 3, the CPU 201 acquires a threshold value managed by the threshold value management unit 232, using a communication speed threshold value table 700 which will be described later.

When the transmission of Data packet including electronic data is completed, in step S508 the host computer 101 transmits a Fin packet requesting disconnection. In step S509, the CPU 201 transmits a Fin_Ack packet, indicative of acceptance of the disconnection request, to the host computer 101. In response, in step S510 the host computer 101 transmits an Ack packet, indicating that the connection has been cut off, to the information processing apparatus 102. The time of this transmission is defined T2. The timer unit 226 stops the clocking, which has started at T1.

When the connection is cut off, in step S511 the CPU 201 ends collection of the transmitted or received communication packets in the storage unit 231. Next, in step S512, the CPU 201 acquires the data size of the transmitted or received communication packets counted by the counting unit 227. In step S513, the CPU 201 acquires from the timer 212 the connection time, which has been necessary for communication packet transmission and reception during the connection, using the timer unit 226. The timer unit 226 may acquire the system time at T1 and T2 for calculating the connection time by T2−T1.

In step S514, the CPU 201 calculates communication speed (data size/connection time), representing communication performance, by the calculation unit 223. In step S515, the CPU 201 employs the determination unit 221 to compare the communication speed, which has been calculated in step S514, with the threshold value, which has been acquired from the threshold value management unit 232 in step S507. If the communication speed is equal to or lower than the threshold value, the determination unit 221 determines that the communication has not properly been performed. The discarding unit 225 ends the control while having the communication packet storage unit 231 maintain the stored communication packets. On the other hand, if the communication speed exceeds the threshold value, the determination unit 221 determines that the communication has properly been performed, and the control proceeds to step S516.

In step S516, the CPU 201 discards (deletes) the communication packets, which have been stored in the communication packet storage unit 231 of the HDD 208, using the discarding unit 225.

As has been described above, the information processing apparatus 102 according to the present embodiment judges a communication performance failure in a case where the communication speed is slower than a predetermined communication speed (threshold value), and makes the HDD 208 maintain the communication packets. In other words, discarding properly received data, which is unnecessary in specifying the cause of communication failure, contributes to improved memory efficiency. Furthermore, since the information processing apparatus 102 prepares, in advance, threshold values of communication speed which correspond to combinations of communication protocols and communication modes, the information processing apparatus 102 can collect communication packets in accordance with various communication protocols and communication modes.

FIG. 6 shows an example of a table 600 defining connection-oriented communication protocol types, which are supported by the information processing apparatus 102 according to the present embodiment, and their corresponding TCP port numbers. The table 600 is stored in advance in the ROM 202 or the like. Numeral 601 in FIG. 6 denotes the type of connection-oriented communication protocol. Numeral 602 denotes a port number corresponding to each communication protocol type 601.

The identification unit 222 identifies a communication protocol type 601 based on a port number which is designated by the host computer 101 when the connection is established. More specifically, when a connection establishment request is received at, for example, port number 9100, the identification unit 222 identifies that the communication protocol type 601 is RAW. The table 600 is used in the control of the aforementioned step S505.

FIG. 7 shows an example of a threshold value table 700 for deciding a threshold value in the information processing apparatus 102 according to the present embodiment. In the present embodiment, the threshold value table 700 is managed in advance by the threshold value management unit 232. Numeral 701 in FIG. 7 denotes a communication mode. Numeral 702 denotes a communication protocol. Numeral 703 denotes a threshold value (communication speed) corresponding to each combination of the communication mode 701 and the communication protocol 702.

The threshold value table 700 defines, as a threshold value, a lower limit of proper communication performance for each combination of six types of communication modes 701 and four types of communication protocols 702 supported by the information processing apparatus 102. Generally, the simpler the procedure of the communication protocol, the smaller the communication overhead. For this reason, simple protocols such as RAW, LPR or the like, can realize communication at higher speed than protocols such as IPP, SMB or the like which have more complicated procedures, even if the communication is performed in the same communication mode. With regard to a communication mode, the communication speed gradually becomes fast as in 10 Mbps, 100 Mbps, 1000 Mbps. Furthermore, full-duplex communication capable of simultaneously performing bi-directional communication achieves faster speed than half-duplex communication. Moreover, even if a high-speed communication environment is set, communication faster than 8 Mbps is not performed since the processing speed of the information processing apparatus 102 has limits. In light of this condition, the most appropriate threshold values are set in advance in the threshold value table 700.

Note, it is assumed herein that the threshold value table 700 is stored in advance in the threshold value management unit 232 at the time of shipment of the information processing apparatus 102. However, it may be configured so that the threshold values defined in the threshold value table 700 can be updated by an administrator as needed. For instance, in actual use, the communication speed which is calculated by the calculation unit 223 each time communication with an external apparatus is performed may be sampled, and an average value of the communication speed which is calculated based on a predetermined number of times of sampling results for each combination of a communication protocol and a communication mode may be used to update the threshold value management unit 232. Furthermore, although the present embodiment decides a threshold value using a communication mode and a communication protocol as parameters, a combination of other parameters may be used.

As has been described above, the information processing apparatus 102 according to the present embodiment compares communication performance of the communication between the apparatus 102 and an external apparatus with a predetermined threshold value, and in a case where communication has not properly been performed, the apparatus 102 maintains the communication packets transmitted or received in this communication. More specifically, the information processing apparatus 102 automatically stores communication packets in a case of communication failure in order to specify a cause of the failure, and discards communication packets in a case where a communication failure has not occurred, in view of the memory efficiency. By virtue of this configuration, the information processing apparatus 102 can suitably store communication packet data which is necessary for performing a cause analysis when a communication failure occurs. Therefore, the information processing apparatus 102 can contribute to efficient restoration work of a service person at the time of a communication failure, and can perform appropriate information collection with excellent memory efficiency.

Note that the present invention is not limited to the above-described embodiment, and various modifications are possible. For instance, the information processing apparatus 102 may store a threshold value, indicative of a lower limit of proper communication performance, for each combination of a communication protocol used between the apparatus and an external apparatus, and a communication mode indicative of the type of communication line. By comparing the threshold value corresponding to a combination of a communication protocol and a communication mode with a communication performance which is performed between the apparatus 102 and an external apparatus, the information processing apparatus 102 can determine whether or not a communication failure has occurred. In other words, the present embodiment can prevent such a situation in which, despite the fact that communication is properly performed with a slow-speed communication protocol or communication mode, communication packets are unnecessarily maintained because of a high threshold value which has been set for determination of proper communication.

Furthermore, in specifying the communication protocol used in communication between the information processing apparatus 102 and an external apparatus, the apparatus 102 may specify the communication protocol based on a port number used in the communication. In this case, a table defining the type of communication protocol corresponding to the port number is stored in advance in the information processing apparatus 102. By preparing the information, the information processing apparatus 102 can easily identify a communication protocol and realize high processing speed.

Furthermore, in the foregoing description, all communication packets transmitted or received in communication during established connection are once stored in the communication packet storage unit 231, and thereafter unnecessary communication packets are discarded in accordance with a determination result of the determination unit 221. However, other embodiments may be adopted. More specifically, an embodiment may be configured in a way that, during established connection whether or not communication is properly performed is determined as needed, and as long as the communication is performed properly, communication packets are not stored in the communication packet storage unit 231. Alternatively, all communication packets transmitted or received may be stored in the communication packet storage unit 231, and in a case where the remaining storable capacity of the storage unit 231 runs short, the communication packets transmitted or received in the communication which has not properly been performed may preferentially be stored. In other words, in this case, communication packets transmitted or received in the communication which has properly been performed are discarded (deleted) first.

Other Embodiment

Besides the above-described embodiment, the present invention can be realized in other forms of an embodiment, for example, system, apparatus, method, program, storage medium (recording medium) and the like. More specifically, the present invention may be applied to a system constituted by a plurality of devices, or to an apparatus comprising a single device.

Further, the present invention includes a case where a software program (in the embodiment, a program corresponding to the flowchart shown in the drawing) realizing the functions of the above-described embodiment is supplied to a system or an apparatus directly or remotely from an external apparatus, and the supplied program codes are read and executed by a computer of the system or apparatus.

Therefore, for realizing the functions according to the present invention by a computer, program codes installed in the computer also constitute the invention. In other words, the present invention includes the computer program itself which realizes the functions of the present invention.

In this case, as long as the program function is achieved, the form of program codes may be of object codes, a program executed by an interpreter, script data supplied to an OS, or the like.

Recording media for providing the program include the following: for example, a floppy (registered trademark) disk, a hard disk, an optical disk, a magneto-optical disk, MO, CD-ROM, CD-R, CD-RW, a magnetic tape, a non-volatile memory card, ROM, and DVD (DVD-ROM, DVD-R).

Besides the above method of providing the program, the program may be downloaded from an Internet website to a recording medium such as a hard disk using a browser of a client computer. More specifically, a client computer links to a website to download the computer program according to the present invention or a compressed file including an automatic installation function from the website. In addition, program codes constituting the program according to the present invention may be divided into plural files, and each of the files may be downloaded from different websites. In other words, the present invention includes a WWW server which allows plural users to download the program file realizing the functions of the present invention on a computer.

Furthermore, a program according to the present invention may be enciphered and stored in a storage medium, such as a CD-ROM, which is then distributed to users. A user who satisfies a predetermined condition is allowed to download key data from an Internet website for deciphering the encryption. With the use of the key data, the enciphered program can be executed and installed in a computer.

Furthermore, the functions according to the above embodiment are realized by executing the program which is read by a computer. Besides, the functions according to the above embodiment can be realized in a case where an OS (operating system) or the like working on the computer performs part or the entire processes in accordance with designations of the program and executes processing.

Furthermore, the functions according to the above embodiment can also be realized in a case where the program read from the recording medium is written in a function expansion card which is inserted into the computer or in a memory provided in a function expansion unit which is connected to the computer. More specifically, a CPU or the like contained in the function expansion card or unit performs part or the entire processes in accordance with designations of the program and realizes functions according to the above embodiment.

According to the present invention, it is possible to provide an information processing apparatus which suitably collects information necessary for performing a cause analysis when a communication failure occurs.

In particular, in connection-oriented communication, abnormal communication speed is detected based on different threshold values which are set in accordance with a communication protocol and a communication mode, and then communication packets are stored. By virtue of this configuration, it is possible to efficiently store information (communication packets) which is necessary for analyzing a cause of communication failure. Accordingly, it is possible to save the memory source and efficiently analyze a cause of communication failure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-088259 filed on Mar. 28, 2008, which is hereby incorporated by reference herein in its entirety.

What is claimed is:

1. An information processing apparatus, which communicates with an external apparatus through a network, and which has a communication packet storage unit configured to store a communication packet that has been transmitted or received in communication between the information processing apparatus and the external apparatus, comprising:
   a communication unit configured to establish a connection for communication between the information processing apparatus and the external apparatus;
   a threshold value management unit configured to manage a threshold value which is different for each combination of a communication protocol and a communication mode used in communication between the information processing apparatus and the external apparatus;
   a comparing unit configured to compare a communication speed during the communication, with the threshold value which is managed by said threshold value management unit in association with the communication protocol and the communication mode actually used in the communication; and
   a control unit configured to, in a case where it is determined as a result of the comparison by said comparing unit that the communication speed is lower than the compared threshold value, have the communication packet storage unit maintain the communication packet that has been transmitted or received in the communication from the time the connection is established for the communication until the time the connection is disconnected.

2. The information processing apparatus according to claim 1, further comprising a discarding unit configured to, in a case where it is determined as a result of the comparison by said comparing unit that the communication speed is faster than the compared threshold value, discard the communication packet, which has been transmitted or received in the communication from the time the connection is established until the time the connection is disconnected, and which has already been stored in said communication packet storage unit.

3. The information processing apparatus according to claim 1, further comprising a calculation unit configured to calculate the communication speed during the communication based on the time from connection establishment until disconnection and a data size of the communication packet that has been transmitted or received during the communication.

4. The information processing apparatus according to claim 1, further comprising:
   a port management unit configured to manage a port number of the information processing apparatus in association with a communication protocol which uses a port indicated by the port number; and
   an identification unit configured to identify a communication protocol used in the communication during the connection based on the port number used in the communication during the connection.

5. A control method executed by an information processing apparatus, which communicates with an external apparatus through a network and which has a communication packet storage unit configured to store a communication packet that has been transmitted or received in communication between the information processing apparatus and the external apparatus, comprising:
   establishing a connection for communication between the information processing apparatus and the external apparatus;
   managing a threshold value which is different for each combination of a communication protocol and a communication mode used in communication between the information processing apparatus and the external apparatus;
   comparing a communication speed during the communication with the threshold value which is managed in said managing step in association with the communication protocol and the communication mode actually used in the communication; and
   in a case where it is determined as a result of the comparison in said comparing step that the communication speed is lower than the compared threshold value, having the communication packet storage unit maintain the communication packet that has been transmitted or received in the communication from the time the connection is established until the time the connection is disconnected.

6. The control method of an information processing apparatus according to claim 5, further comprising,
   in a case where it is determined as a result of the comparison in said comparing step that the communication speed is faster than the compared threshold value, discarding the communication packet, which has been transmitted or received in the communication from the time the connection is established until the time the connection is disconnected, and which has already been stored in the communication packet storage unit.

7. The control method of an information processing apparatus according to claim 5, further comprising:
   calculating the communication speed during the communication based on the time from connection establishment until disconnection and a data size of the communication packet that has been transmitted or received during the communication.

8. The control method of an information processing apparatus according to claim 5, further comprising:

managing a port number of the information processing apparatus in association with a communication protocol which uses a port indicated by the port number; and identifying a communication protocol used in the communication during the connection based on the port number used in the communication during the connection.

9. A non-transitory computer-readable storage medium storing a computer program which causes a computer to execute the control method of an information processing apparatus described in claim 5.

* * * * *